July 3, 1956        H. S. CLARK        2,752,779

HARDNESS TESTING DEVICES

Filed March 15, 1954        2 Sheets-Sheet 1

INVENTOR.
HAROLD S. CLARK
BY Daniel G. Cullen
ATTORNEY

July 3, 1956 H. S. CLARK 2,752,779
HARDNESS TESTING DEVICES
Filed March 15, 1954 2 Sheets-Sheet 2

INVENTOR.
HAROLD S. CLARK
BY
ATTORNEY

United States Patent Office 2,752,779
Patented July 3, 1956

2,752,779

HARDNESS TESTING DEVICES

Harold S. Clark, Detroit, Mich.

Application March 15, 1954, Serial No. 416,244

3 Claims. (Cl. 73—83)

This invention relates to a hardness testing machine wherein the minor load and major load are automatically applied.

In a conventional hardness testing machine, there is provided a movable anvil, upon which a work-piece is placed, and a work-piece contacting member. The work-piece contacting member has a tip formed of a hard material, such as diamond, which tip is adapted to pierce the surface of a work-piece under appropriate pressure. The depth into which the tip sinks into the work-piece surface is used to indicate relative hardness of the work-piece surface.

In order to eliminate the effects of roughness of the work-piece surface and in order to obtain uniformity of reading a so-called minor load is obtained by moving the anvil toward the work-piece contacting member until said member exerts a predetermined pressure upon the work-piece. In the conventional hardness tester, the anvil is moved manually by a screw arrangement. A dial indicator connected with the work-piece contacting member indicates when the desired minor load is attained.

After the minor load is applied, a manual trip means is operated to apply the major load to the work-piece contacting member to cause said member to pierce the work-piece surface.

It is apparent that it takes a relatively long period of time to manually adjust the anvil to obtain the exactly desired minor load and also to manually trip the major load applying means.

In production, where a large number of work pieces are to be tested and where the hardness tester is generally operated by unskilled labor, the time needed to manually apply the respective loads to the tester is multiplied, and of course, becomes an important cost factor.

It is therefore, an object of this invention to provide a means whereby the exact minor load, as well as the major load, are applied automatically and are released automatically.

Another object of this invention is to provide an automatic means whereby the exact minor load is quickly applied to the work piece, held until after the major load is applied and the indicator reading taken, and then released.

Another object of this invention is to provide a means for automatically applying a major load to the work-piece contacting member and then to automatically release such load after a short delay during which the relative hardness reading may be taken.

Yet another object is to provide a means wherein an exact minor load may be automatically applied and held, following which a major load is automatically applied for a short period of time, and thereafter, both loads are automatically released simultaneously.

It is still a further object to provide a continuously operating automatic minor and major load applying and releasing means, whereby a work-piece may be inserted into the tester during the load released part of the cycle, tested and then removed at the completion of the cycle when the loads are again automatically released.

Other objects and advantages of the invention will become apparent from the following description.

In the accompanying drawings forming a part of the specification and showing a preferred form of this invention:

Figure 1:
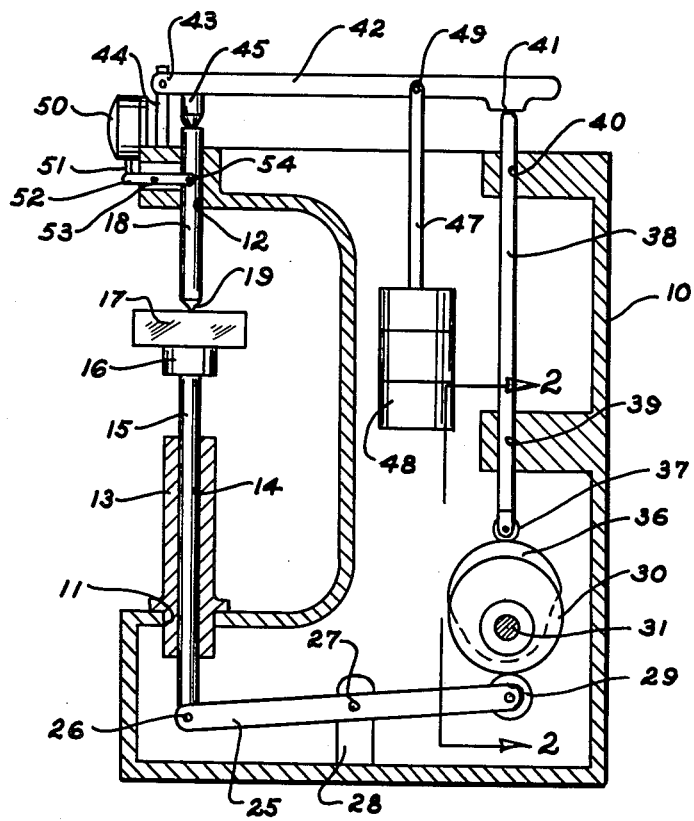
Fig. 1 is a cross-sectional view of my tester showing one form of automatic minor and major load operating means.

As seen in Fig. 1, there is illustrated a hardness tester having a C-shaped body 10 formed with aligned openings 11 and 12. Extending through opening 11 and secured to the tester body is an anvil rod support bearing 13 having a central bore 14. Slidably mounted within the bore is an anvil rod 15. An anvil 16 is shown secured to the end of rod 15. It is upon this anvil that the work-piece 17 to be tested is placed.

Positioned opposite the anvil and slidably extending through opening 12 is a work-piece contacting member 18 having a hardened tip 19 formed of diamond or the like. The diamond tip 19 is adapted to pierce the surface of the work-piece upon application of an appropriate load.

When the tester is in its inoperative position the anvil and work-piece contacting member are spaced a sufficient distance to permit the insertion of a work-piece between the two. In order to bring the work-piece contacting member into contact with the work-piece and to apply the minor load, the anvil is elevated a predetermined amount. The elevation of the anvil is achieved by pushing the anvil rod 15 upwards. Thus, a link 25 is pivoted to the anvil rod at 26 and is further pivoted at 27 to a bracket 28 which bracket is secured to the tester body 10. The free end of the link 25 supports a roller 29 which contacts a cam 30 mounted on a shaft 31.

The cam 30 is so shaped that upon rotation thereof, the free end of the link 25 is forced down to thereby cause the opposite end of the link to push the anvil rod up. The periphery of the cam starts at a low point, as seen in Fig. 1, and increases in radius until the proper radius to obtain the desired minor load is reached. Thereafter, this minor load radius continues for a distance around the cam until the radius drops back to the original low point described above. The object of forming the constant minor load radius is to hold the minor load for a short period of time during which time the major load is applied.

Figure 2:
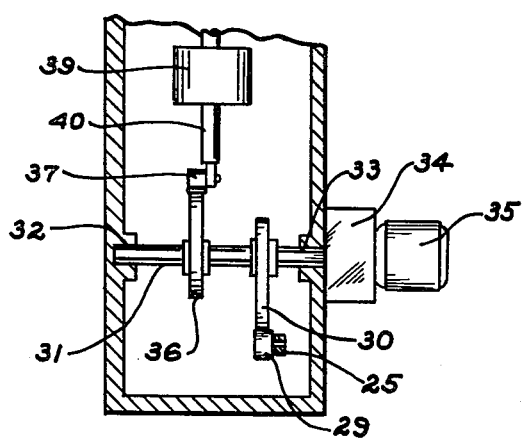
Fig. 2 is a view taken on 2—2 of Fig. 1.

The shaft 31, as illustrated in Fig. 2, is mounted in bushings 32 and 33. Bushing 33 is open at both ends and shaft 31 extends therethrough to connect with gear box 34. In the gear box are gears (not shown) driven by electric motor 35 to cause constant rotation of the shaft 31.

Also mounted on shaft 31 is a cam 36 which is adapted to apply and remove the major load from work-piece contacting member 18. A description of this cam will follow hereinafter.

Engaging cam 36 is a roller 37 secured to a rod 38 reciprocally mounted in bushings 39 and 40. The upper end of rod 38 contacts a protuberance 41 on an arm 42. This arm 42 is pivotably fastened at 43 to a bracket 44 which is connected to the tester body 10.

At the end of said arm 42, near the pivot 43 is attached an extension 45. As seen in Fig. 1, the extension engages the top surface 46 of the work-piece contacting member 18. To apply a load to arm 42, a link 47 supporting major load weights 48 is pivoted at 49. Thus, it is apparent that the major load of weights 48 acts to pull arm 42 downward. In so doing, the load is transmitted to extension 45 and is in turn transmitted to workpiece contacting member 18 to cause the hardened tip 19 to sink into the surface of the work-piece.

A dial indicator 50 is mounted on the front of the tester body 10. This indicator has a vertically slidable link 51 contacting a link 52 pivoted to the tester body at 53 and to the contacting member 18 at 54. Thus, movement of the contacting member, due to the application of the minor or major load is transmitted to link 51 to cause a reading on the dial indicator. The indicator itself forms no part of this invention and accordingly its details of construction are omitted.

Referring to cam 36, this cam is so formed that its high point is spaced 180 degrees from the low point of cam 30. Therefore, arm 42 is kept in its unloaded or upward position at the same time that the anvil 16 is in its lowest position. The high point of cam 36 is constant for a distance around the cam periphery and then slowly tapers down to a low point. After the low point there is a quick rise back to the high point.

The cams 30 and 36 are so formed relative to each other, that the minor load is first applied and then held constantly by the cam 30. Then the rod 38 slowly slides down due to cam 36 until the major load is fully applied. After this, both the major and minor loads are released by the simultaneous action of both cams.

The major load, it is noted, is applied slowly in order to avoid any heavy shocks, to the link system and to the hardened penetrating tip 19.

Figure 3:
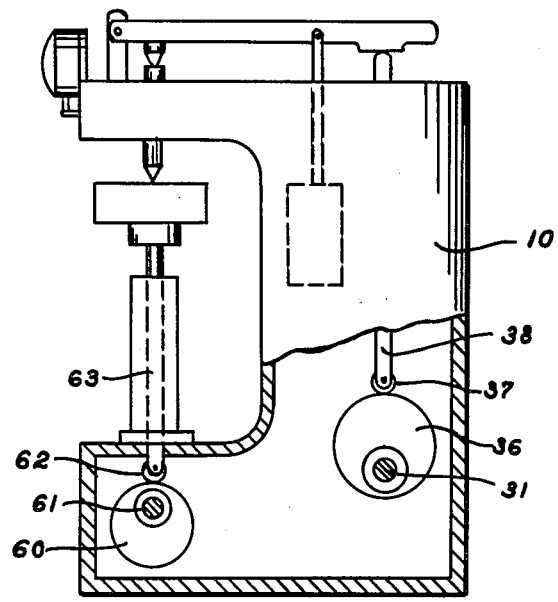
Fig. 3 is a view partially broken away, showing a modification of the load operating means.

In the modification of Fig. 3, there is shown a hardness tester which is substantially the same as that shown in Fig. 1. However, in this modification, only the cam 36 is mounted on shaft 31 which is rotated by a motor (not shown). The anvil rod moving cam 60 is mounted on a separate shaft 61 which is driven by a separate motor (not shown). If desired both motors may be electrically synchronized to operate both cams in unison or both shafts 61 and 31 may be connected by a chain or the like and driven by one motor.

One of the advantages of the separation of the cams is that the cam 60 exerts a direct push on roller 62 mounted on the lower end of the anvil rod 63. Moreover, if two motors are used, it is possible to operate each motor separately. For example, the cam 60 may be rotated until the proper minor load is attained and then stopped in that position. Next, the cam 36 may be operated to apply the major load and may be held in the major load applying position for as long as necessary. Therefore, both motors may be actuated to rotate the cams to their unloaded positions.

Figure 4:
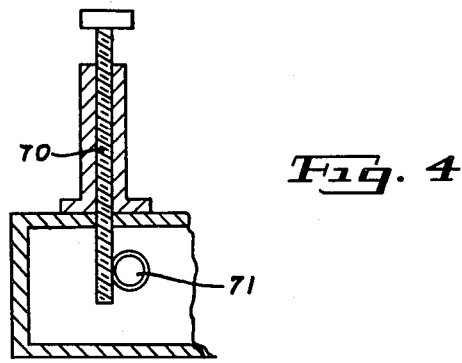
Fig. 4 shows a third modification of the load operating means.

Other driving means may be substituted for the cams shown in Figs. 1 to 3. For example, in Fig. 4 there is shown a modification wherein a threaded anvil rod 70 is rotated by a worm 71 which is driven by a motor.

Another example, not illustrated, may be the use of a fluid pump to exert fluid pressure upon the bottom of anvil rod to cause the anvil rod to rise.

This invention may be developed within the scope of the following claims without departing from the essential features of the said invention and it is desired that the specification and drawings be read as being merely illustrative of a practical embodiment of the same and not in a strictly limiting sense.

I claim:
1. A hardness tester comprising a movable anvil, a work-piece contacting member aligned with and positioned opposite said anvil and having a work-contacting point spaced from said anvil a sufficient distance so that a work-piece may be inserted therebetween and rested upon said anvil, a first driven cam operatively associated with said anvil to move said anvil towards and away from said work-piece contacting member, said cam being shaped to move said anvil a predetermined distance toward said work-piece contacting member to cause said point to penetrate a work-piece surface and to hold said anvil in such position for a portion of the surface of said cam and then to return said anvil to its initial unmoved position, all during one rotation of said cam; a weight supporting member contacting said work-piece contacting member; a second cam, a cam rod operatively associated with said second cam and connected with said weight supporting member to apply the load of said weight to said work-piece contacting member when said second cam is at its low point and to remove said load when said cam is at its high point, the low point of said second cam being so located as to apply said load during the period when said anvil is held in position where said point is penetrating a work-piece surface, each of said cams being mounted upon a single motor driven shaft, said cams being simultaneously rotated by said shaft, a linkage interconnecting said first cam with said movable anvil to raise and lower said anvil during a single rotation of said first cam.

2. A hardness tester comprising a frame, an anvil supported by an anvil rod slidably mounted upon said frame, a work-piece contacting member positioned opposite said anvil upon said frame; the weight applying member abutted against said work-piece contacting member to move said member towards said anvil when said weight is applied, a rod supporting said weight applying member at one end thereof and in contact with a first cam at the opposite end thereof, said cam being formed with a low portion wherein said rod releases said weight applying member to apply a load upon said work-piece contacting member and a high portion wherein said rod holds said applying member in a non-load applying position; an arm pivoted to said frame and connecting with said anvil rod at one end thereof and abutted against a second cam at the opposite end thereof, said second cam having a high portion to move said arm to thereby cause said anvil rod to move towards said work-piece contacting member to hold said rod in said position for a predetermined period of time, and a low portion to release said arm and cause said anvil rod to return to its original position, driving means driving said cams, the rotation of said cams being synchronized so that said weight applying means operate during the time that said anvil is in its raised position.

3. A hardness tester as defined in claim 2 above, wherein both of said cams are rigidly mounted upon a single drive shaft wherein said cams rotate simultaneously.

References Cited in the file of this patent
UNITED STATES PATENTS

| | | |
|---|---|---|
| 1,762,497 | Wilson | June 10, 1930 |
| 2,122,203 | Gogan | June 28, 1938 |
| 2,277,199 | Baxendale | Mar. 24, 1942 |
| 2,498,136 | Rupley | Feb. 21, 1950 |
| 2,554,206 | Pearson et al. | May 22, 1951 |

FOREIGN PATENTS

| | | |
|---|---|---|
| 700,521 | Germany | Dec. 21, 1940 |